Figure 1:
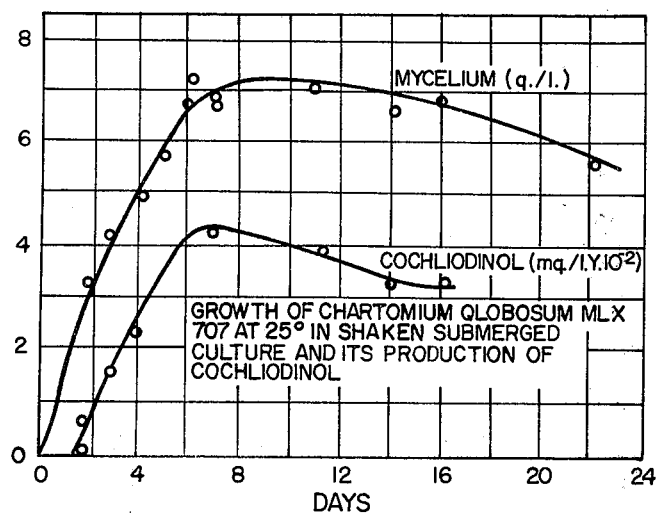

United States Patent [19]

Brewer et al.

[11] 3,917,820

[45] Nov. 4, 1975

[54] ANTIBIOTIC COCHLIODINOL AND PRODUCTION BY CHAETOMIUM, COCHLIODES AND CHAETOMIUM GLOBSUM

[75] Inventors: Donald Brewer, Halifax, Canada; William Arthur Jerram, Melbourne, Australia; Alan Taylor, Dartmouth, Canada

[73] Assignee: Canadian Patents & Development Ltd., Ottawa, Canada

[22] Filed: Feb. 25, 1972

[21] Appl. No.: 229,547

Related U.S. Application Data

[63] Continuation of Ser. No. 829,053, May 29, 1969, abandoned.

[52] U.S. Cl. .............................................. 424/122
[51] Int. Cl............................................. A61k 27/00
[58] Field of Search ........................... 424/116–120, 424/122

[56] References Cited

OTHER PUBLICATIONS

Christensen et al., Applied Microbiology, 14 (1966), pp. 774–777.

Waksman et al., Journal of Bacteriology, 48, (1944), pp. 527–530.

*Primary Examiner*—Albert T. Meyers
*Assistant Examiner*—Daren M. Stephens
*Attorney, Agent, or Firm*—Fidelman, Wolffe & Leitner

[57] ABSTRACT

A purple pigment, named cochliodinol, $C_{32}H_{32}N_2O_4$, has been isolated from three isolates of *Chaetomium cochliodes* and from two isolates of *Chaetomium globosum*. The pigment is produced intracellulary on a wide range of media in quantities up to 0.45 mg/ml. The rate of production for a given isolate is proportional to its growth. Cochliodinol exhibits antibacterial fungistatic and fungicidal properties.

2 Claims, 3 Drawing Figures

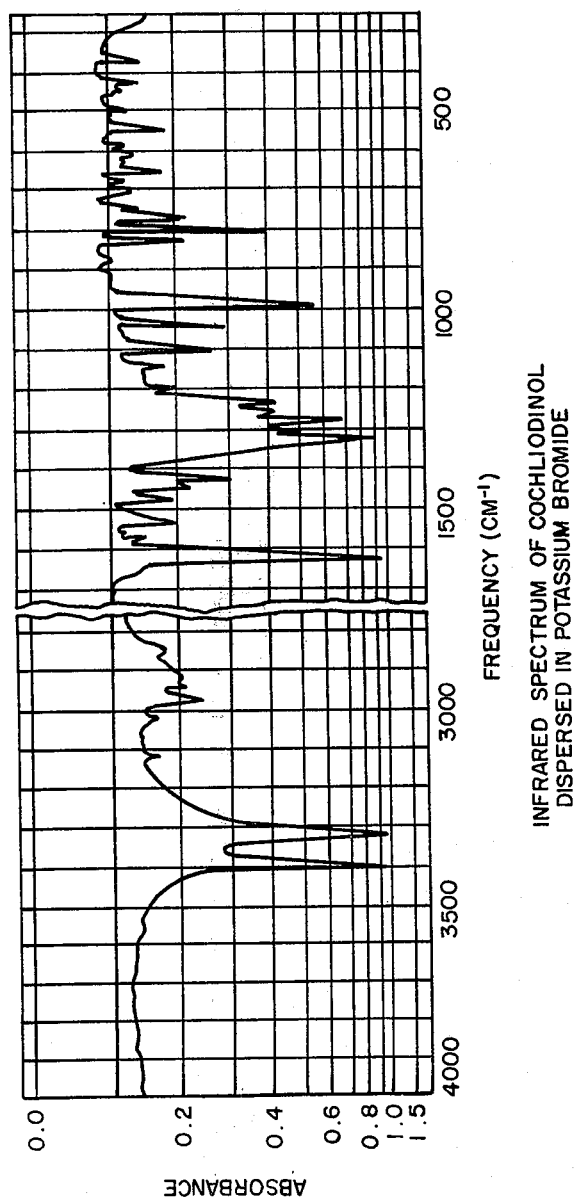

ANTIBIOTIC COCHLIODINOL AND PRODUCTION BY CHAETOMIUM, COCHLIODES AND CHAETOMIUM GLOBSUM

This is a continuation of application Ser. No. 829,053 filed May, 29, 1969, and now abandoned.

This invention relates to new antibacterial fungistatic and fungicidal compounds; and to processes for their production and recovery.

More particularly, the present invention relates to a purple pigment material hereinafter identified by the name cochliodinol which exhibits antibacterial, fungistatic and fungicidal properties. Cochliodinol has been isolated from several strains of Chaetomium cochliodes and of Chaetomium globosum. The invention relates also to the (non-toxic) salts of cochliodinol particularly the salts with inorganic cations and to hydrogenated cochliodinol, identifiable as tetra-hydrocochliodinol.

The organisms which produce cochliodinol may be cultered at a temperature in the range of about 23°C – 30°C under submerged aerobic conditions in an aqueous nutrient medium containing an assimilable, fermentable carbohydrate and organic nitrogen source such as for example starch, dextrin, sugars etc., and casein hydrolyzate, soybean meal, cornsteep liquor, etc. By and large the fermentation media and conditions may be those generally employed in the fermentation procedures of antibiotic manufacture. The fermentation is carried out for about two to eight days, preferably 6 to 7 days. At the end of this time period recoverable amounts to cochliodinol have been formed.

As has been indicated above, cochliodinol has been recovered from strains of Chaetomium cochliodes obtained from diverse sources, i.e. from ATCC 10195, from the Canada Department of Agriculture, Ottawa (44-1187A) originally isolated from pea seed in 1945, from the Canada Department of Agriculture, Kentville, Nova Scotia (KE-322) originally isolated from a diseased strawberry crown in May, 1963, and other designated HLX 833, HLX 834. Cochliodinol also has been recovered from two strains of Chaetomium globosum Kunze, HLX 707 and HLX 819, Atlantic Regional Laboratory, Halifax, Nova Scotia. However not all available strains of the above species produced cochliodinol but screening for cochliodinol production can be carried out quickly.

The cochliodinol is removed from the mycelium by macerating the mycelium in water, lyophilizing the resulting slurry followed by extraction with water-immiscible solvents, e.g. benzene. The pure crystalline cochliodinol is subsequently recovered from the oily extract, e.g. by chromatography and recrystallization.

It has been deduced that the structure of cochliodinol consists of a symmetrical dimer-like molecule where each monomer ($C_{16}H_{16}NO_2$) containing a trisubstituted aromatic ring (1, 2, 4 substitution) and an isopentenyl side-chain linked to a quaternary carbon atom ($Me_2C : CH CH_2C$). Cochliodinol has acidic hydroxyl groups which can be alkylated or esterified. These hydroxyl groups are sufficiently acidic to form stable salts with organic and inorganic cations, e.g. $Mg$, $Ca$, $K^+$, $Na^+$, $NH$, $(CH_2CH_2OH)_3^+$. The sodium and potassium salts of cochliodinol are more soluble in water than cochliodinol. The salts are active exhibiting for example considerable activity against Pseudomonas species. Cochliodinol can be hydrogenated readily to what may be termed tetra-hydro-cochliodinol, a compound which also exhibits antibiotic properties. By reaction with diazomethane di-methyl cochliodinol can be prepared.

Cochliodinol is a fungistatic agent against plant pathogenic fungi and is a disinfectant and topical antiseptic.

Cochliodinol inhibits the growth of the following organisms at the indicated minimum concentration: Aspergillus niger, Chaetomium cochliodes, Pithomyces chartarum, Penicillium terlikowskii, Fusarium oxysporum at 10 µg/ml. Zygorhynchus sp., Penicillium expansum, Botrytis allii at 40 µg/ml and Trichoderma viride at 100 µg/ml, Bacillus subtilis 10 µg/ml, Micrococcus epidermitidis 10 µg/ml, Pseudomonas aeruginosa 30 µg/ml, Escherichia coli 200 µg/ml, Aerobacter aerogenes 300 µg/ml in vitro. Human epithelial cells (Hela) exhibited cytopathological changes when treated with cochliodinol at 10 µg/ml. Tetrahydrocochliodinol inhibited the growth of Fusarium oxysporum at 40 µg/ml and cochliodinyl acetate was inhibitory to this organism at 100 µg/ml. Cochliodinol was fed to turkey poults at 30 mg/kg one of four animals died, the other three were normal, (death was probably not due to cochliodinol). Fed to rats at 200 mg/kg., all animals gained weight and after slaughter no obvious lesions were observed.

The invention is further illustrated by the following examples:

EXAMPLE I

Inocula were prepared in all cases by sterile transfer of a piece of a culture on 2 percent malt agar into 50 ml of 2 percent w/v malt extract (Difco). The cultures were grown at 25° for 4 days in Erlenmeyer flasks of 125 ml capacity. Each flask was shaken in a horizontal plane at 220 r.p.m. and described a circle of radius 1.9 cm. The entire culture was macerated in a blender for 30 seconds and the suspension (4 ml) used as an inoculum in the production medium (1 liter). The production medium was: Bacto vitamin-free casamino acids (10 g), dipotassium hydrogen phosphate (1 g), magnesium sulfate heptahydrate (0.5 g), potassium chloride (0.5 g), ferrous sulfate heptahydrate (0.01 g) sucrose (10 g) and the vitamins in suitable concentrations in water (1 liter). The cultures (1 liter) were incubated at 25° in Erlenmeyer flasks of 2 liter capacity and were shaken as described above for the inocula.

HARVESTING AND ISOLATION

After incubation for the times stated below the flasks were removed from the incubator and the cultures filtered through Whatman No. 31 paper. The mycelium was macerated with water (1 liter) in a blender and the resulting slurry lyophilized. The dry mycelium (120 g) was extracted with benzene in a soxhlet extractor for 24 hours and the extract evaporated at < 40°/14 mm. The resulting oily material (4.7 g) was dissolved in petroleum ether (b.p. 60°–80°, 270 ml) and methanol (330 ml) and then water (30 ml) was added. The mixture was shaken, the phases separated and the methanol-water phase re-extracted with petroleum ether. The methanol-water phase was separated and evaporated at < 40°/14 mm. The residue (1.95 g) was dissolved in benzene and chromatographed on a column of silicic acid (Mallinckrodt CC7, 100–200 mesh, 500 g). The column was eluted with benzene (4 liters), and then diethyl ether-benzene (1:9) until the eluate was colorless. The diethyl ether-benzene (1:9) eluate was evaporated, the residue (1.1 g) in benzene in (50 ml) treated with petroleum ether (b.p. 60°–80°, 50 ml) and the purple precipitate (0.8 g) collected. This precipitate was dissolved in benzene (50 ml), was adsorbed on silicic acid (500 g) and the column eluted with benzene for 4 days. The purple band which was slowly eluted was collected giving cochliodinol, 0.75 g, m.p. 206°–208° (decomp.).

The production of cochliodinol from several Chaetomium isolates as carried out above with a 7 day growth period at 25°C is shown in Table I below. A small quantity of a fluorescent pigment (cochliodinone) was always associated with cochliodinol, but can be separated therefrom, appearing in the benzene eluate.

The rate of formation of cochliodinol by HLX 707 is shown in FIG. 1 where the growth rate of the organism is also given.

TABLE I

| Isolate No. | HLX 366 | HLX 374D | HLX 374W | HLX 707 | HLX 819 |
|---|---|---|---|---|---|
| Mycelium dry wt. (mg/ml) | 14.4 | 11.2 | 15.5 | 7.0 | 8.9 |
| Cochliodinol (mg/ml) | 0.05 | 0.11 | 0.002 | 0.40 | 0.20 |

The *C. globosum* isolates produced more than twice as much cochliodinol as the *C. cochliodes* isolates. Although for a given isolate the production rate is proportional to growth, different isolates produce very different amounts of cochliodinol.

The effect of the growth medium on cochliodinol production is substantial. Cochliodinol is produced when HLX 707 is grown on the corn medium described by Christensen et al "Toxicity to Rats of Corn invaded by *Cnaetomium globosum*." Appl. Microbiol. 14 (1966) 774–777 and on the corn steep medium of Waksman and Bugie "Chaetomin, a New Antibiotic Substance Produced by *Chaetomium cochliodes*" J. Bacteriol. 48 (1944) 527–530.

EXAMPLE II

Following the procedure of Example I cochliodinol was produced by HLX 707 grown for 7 days at 25° on the production medium with diverse carbohydrates. The results are shown on the following table.

TABLE II

|  | Sucrose | Glucose | Fructose | Cellobiose |
|---|---|---|---|---|
| Mycelium dry wt. (mg/ml) | 7.4 | 6.4 | 7.6 | 9.2 |
| Cochliodinol (mg/ml) | 0.19 | 0.06 | 0.09 | 0.05 |

CHARACTERIZATION OF COCHLIODINOL

Figure 3:
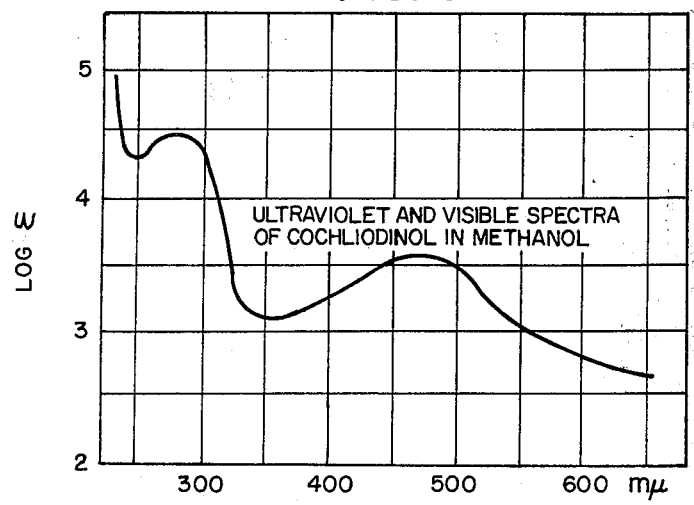

Cochliodinol was obtained on elution from silicic acid as a microcrystalline powder, m.p. 206°–208° having the following elementary composition: C, 74.6; H, 6.5; N, 5.3; O, 12.5 percent. $C_{32}H_{32}N_2O_4$ requires: C, 75.6; H, 6.4; N, 5.5; O, 12.6 percent. In the mass spectrometer a molecular ion was observed at m/e 508.2348; the formula $C_{32}H_{32}N_2O_4$ requires 508.2362. Its infrared spectrum is shown in FIG. 2, and its ultraviolet and visible spectrum as shown in FIG. 3 have maxima in methanol solution at 278mμ and 471mμ (log ε 4.49 and 3.55 respectively) and in chloroform solution at 278mμ and 484mμ (log ε 4.50, 3.60). When treated with acetic anhydride and pyridine it readily formed a diacetate which had the following elementary composition: C, 73.1%; H, 6.0%; N, 4.6%; O, 15.6%. $C_{36}H_{36}N_2O_6$ requires C, 72.8%; H, 6.1%; N, 4.7%; O, 16.2%. The precise mass of this molecular formula is 592.2573. When the diacetate was inserted into the source of the mass spectrometer at 265° an ion was obtained having m/e 592.2573. A value of 650 was obtained when the molecular weight of this diacetate was determined cryoscopically.

EXAMPLE III

To two parts of cochliodinol were added 110 parts of acetic anhydride and 1 part of pyridine. After 1 minute at 20°C the mixture was poured onto 400 parts of ice and the *cochliodinyl acetate* collected. the cochliodinyl acetate had M.P. 199°–200°C.

EXAMPLE IV

To one part of cochliodinol in 100 parts of ether was added a solution of excess diazomethane in ether. The reaction mixture was evaporated and the residue was recrystallized from 50 parts of methanol. The dimethyl cochliodinol thus obtained has m.p. 208°–210°C.

EXAMPLE V

One part of cochliodinol was dissolved in 200 parts of acetic acid and the solution with 0.01 part of platinum oxide added was sealed in flasks under a pressurized hydrogen atmosphere then shaken at room temperature until the solution was colorless and a colorless precipitate had separated. The mixture was then shaken with an oxygen atmosphere until no further uptake of gas occurred. The mixture was filtered, evaporated, the residue adsorbed on 60 parts of silicic acid from which tetrahydrocochliodinol was eluted with ether-benzene (1:9). Tetrahydrocochliodinol has m.p. 220°–223°C with decomposition, $\lambda_{max}$.(MeOH) 278, 471mμ (log. ε 4.49 3.55).

EXAMPLE VI

One part of cochliodinol was dissolved in 250 parts of n-butyl alcohol and 10 parts of potassium carbonate were added. One part of water was added, the mixture heated to boiling, cooled and filtered. The filtrate was evaporated and the residue recrystallized from 20 parts of n-butyl alcohol giving the potassium salt of cochliodinol m.p. > 320°C.

EXAMPLE VII

Twenty parts of cochliodinol were dissolved in 500 parts of diethyl ether and the solution thus obtained treated with triethylamine until no further precipitation occurred. The salt was collected by filtration and recrystallized from n-butyl alcohol as rhombs m.p. 134°–136°, $\lambda_{max}$. (MeOH) 280mμ (ε40,300).

EXAMPLE VIII

Ten parts of cochliodinol were dissolved in 200 parts of n-butyl alcohol and the solution treated with a solution of triethanolamine (15 parts) in 200 parts of n-butyl alcohol. The green solution was evaporated at 35°/20 mm to one tenth of its volume when the salt crystallized as needles. The salt was collected by filtration and recrystallized from n-butyl alcohol m.p. 153°–155°.

What is claimed is:

1. A compound cochliodinol, having a melting point of 206°–208°C., a molecular weight of about 508, an average elemental analysis generally corresponding to $C_{32}H_{32}N_2O_4$, infra-red, visible, and ultraviolet absorption spectra as shown in FIGS. 2 and 3 of the drawing, derived from a member selected from the group consisting of Chaetomium cochliodes HLX 366, Chaetomium cochliodes HLX 374 D, Chaetomium cochliodes HLX 374 W., Chaetomium globsum HLX 707, and Chaetomium globsum HLX 819.

2. A process for producing the compound of claim 1 comprising culturing said member under aerobic conditions in an aqueous nutrient medium comprising an assimilable fermentable carbohydrate and an organic nitrogen source for about two to eight days and recovering cochliodinol from the mycelium.

* * * * *